(12) United States Patent
Aoki (10) Patent No.: US 6,435,585 B1
(45) Date of Patent: Aug. 20, 2002

(54) ARTICLE STORAGE DEVICE OF MOTORCYCLE

(75) Inventor: Eizo Aoki, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/943,502

(22) Filed: Aug. 31, 2001

(30) Foreign Application Priority Data

Aug. 31, 2000 (JP) ........................................ 2000-263945

(51) Int. Cl.⁷ .............................................. B62D 25/24
(52) U.S. Cl. ................... 296/37.1; 296/37.15; 224/427
(58) Field of Search ............................ 296/37.1, 37.15; 224/427, 275, 412, 428, 433

(56) References Cited

U.S. PATENT DOCUMENTS

| | | | | |
|---|---|---|---|---|
| 4,666,009 A | * | 5/1987 | Yashima et al. ........... | 180/68.5 |
| 4,726,439 A | * | 2/1988 | Iwao et al. ................ | 180/219 |
| 5,044,646 A | * | 9/1991 | Iiga et al. .................. | 180/219 |
| 5,107,949 A | * | 4/1992 | Gotoh et al. ............... | 180/219 |
| 6,336,579 B1 | * | 1/2002 | Sako .......................... | 224/413 |

FOREIGN PATENT DOCUMENTS

| | | | | |
|---|---|---|---|---|
| JP | 402088376 ZA | * | 3/1990 | ............... 296/37.1 |
| JP | 402128971 A | * | 5/1990 | ............... 296/37.1 |
| JP | 402171392 A | * | 7/1990 | ............... 296/37.15 |
| JP | 403132489 A | * | 6/1991 | ............... 296/37.1 |
| JP | 403273983 A | * | 12/1991 | ............... 296/37.1 |

* cited by examiner

Primary Examiner—Stephen T. Gordon
Assistant Examiner—Greg Blankenship
(74) Attorney, Agent, or Firm—Oblon, Spivak, McClelland, Maier & Neustadt, P.C.

(57) ABSTRACT

A motorcycle is provided with an article storage device which is disposed below a rider's seat, and the storage device includes an article accommodation box having an article entrance port formed to be opened upward in a standing state of a motorcycle and a cover member provided for a bottom portion of the seat. The article entrance port has a lateral width larger than a lateral width of an outer peripheral edge of the seat, and the cover member covers the article entrance port formed to the article accommodation box.

10 Claims, 6 Drawing Sheets

ARTICLE STORAGE DEVICE OF MOTORCYCLE

BACKGROUND OF THE INVENTION

The present invention relates to an article storage device of a motorcycle in which an article accommodation box or storage chamber is provided in a motorcycle (vehicle) body.

A motorcycle, particularly a scooter type motorcycle, has been provided with an article storage device including a large-capacity accommodation box capable of storing a large article such as a helmet at a position below a seat, the seat being attached to be opened and closed. Conventional example of such article storage device is for example disclosed in Japanese Patent Laid-Open Publication No. HEI 1-148679, Japanese Patent Laid-Open Publication No. HEI 6-156344 or other.

However, such article storage device has a capacity that can store only one large article such as helmet.

In addition, in recent years, according to large displacement of a motorcycle, in a scooter type motorcycle on which two persons can ride, an article storage device having a capacity and a structure capable of accommodating two helmets including a fellow rider's helmet has been developed. Conventional examples of such article storage devices are disclosed in Japanese Patent Laid-Open Publication No. HEI 10-59255, Japanese Patent Laid-Open Publication No. HEI 11-129969 and Japanese Patent Laid-Open Publication No. HEI 11-129971.

However, in the article storage device having a capacity and a structure capable of storing two helmets, since two helmets are arranged in a longitudinal direction with respect to the front-and-rear direction of the vehicle body, a frame cover which covers the accommodation box and a body frame is extended backward of the vehicle body. Moreover, in a conventional structure, there is a case including a useless dead space in the article accommodation box.

SUMMARY OF THE INVENTION

The present invention has been conceived to solve the above matters, and it is an object of the present invention to provide an article storage device of a motorcycle which is capable of orderly storing large articles without imparting an adverse influence on a function of the vehicle driving or steering stability.

This and other objects can be achieved according to the present invention by providing an article storage device of a motorcycle disposed below a rider's seat, comprising:

an article accommodation box having an article entrance port formed to be opened upward in a standing state of a motorcycle, the article entrance port having a lateral width larger than a lateral width of an outer peripheral edge of the seat; and a cover member provided for a bottom portion of the seat so as to cover the article entrance port formed to the article accommodation box.

In a preferred example of this aspect, the seat includes a rider's seat section on which a rider sits and a pillion section which is connected to a rear portion of the rider's seat section and on which a fellow rider sits, and the article accommodation box has a maximum width portion at a rear portion more than a front end of a sitting portion of the pillion in a longitudinal direction of a body of the motorcycle.

Fellow rider foot rests for the fellow rider are disposed to lower portions of the motorcycle body on both lateral left and right sides of the seat and the maximum width portion of the article accommodation box is provided to a rear portion more than the fellow rider foot rests in the longitudinal direction of the motorcycle body. A width of a portion of the motorcycle body at which the article accommodation box has the maximum width is set to be smaller than an entire width of a handle bar of the motorcycle.

When two helmets are accommodated as article to be stored in the article accommodation box, the article accommodation box has an inner space in which the two helmets are arranged side by side in the width direction of the vehicle body in a plan view. The two helmets may be arranged in an overlapped state in the width direction of the motorcycle body.

The motorcycle is a scooter type motorcycle and the seat includes a rider's seat section and a pillion section.

The cover member is fixed to an upper surface of a bottom portion of the seat by means of vises together with a seat cover of the seat.

According to the structures and characters of the present invention mentioned above, the article port (entrance/take-out port) of the article accommodation box is formed to be wider than the outer peripheral edge of the seat, and the cover member that covers the article port of the accommodation box is provided on the bottom plate of the seat. Therefore, a lot of large articles can be stored orderly without exerting a bad influence on the function of the vehicle driving or steering stability.

In addition, according to the present invention, the article port is formed to be wider than the outer peripheral edge of the seat so that the article port can be made larger than a conventional one, and a large article can be easily put in or out. Further, the cover member covering the article port of the article accommodation box is provided so that the article port can be made larger than a conventional one without damaging outer appearance.

Furthermore, according to the preferred embodiment of the present invention, the article accommodation box has the maximum width portion on the rear position more than the sitting front end of the pillion so that the vehicle body below the rider seat can be made slim, and pedaling ability and riding properties of a rider can be improved.

Furthermore, the maximum width portion of the article accommodation box is positioned on the rear position more than the fellow rider foot rests. Accordingly, the rear body on the side of the article accommodation box hardly interferes with feet of a fellow rider sitting on the pillion section, and thus the riding properties can be improved.

The vehicle width dimension in the maximum width portion of the accommodation box is set to be smaller than the whole width of the handle bar of the motorcycle so as not to impart an adverse effect to narrow road passing ability of the vehicle.

Moreover, according to the present invention, two full-faced helmets can be accommodated in the article accommodation box in the side by side arrangement in the width direction of the motorcycle body with substantially no useless dead space therein. The article accommodation box can be applied to a scooter type motorcycle on which two riders can ride.

The nature and further characteristic features of the present invention will be made more clear from the following descriptions made with reference to the accompanying drawings.

DESCRIPTION OF THE PREFERRED EMBODIMENT

One preferred embodiment of the present invention will be described hereunder with reference to the accompanying drawings.

Figure 1:
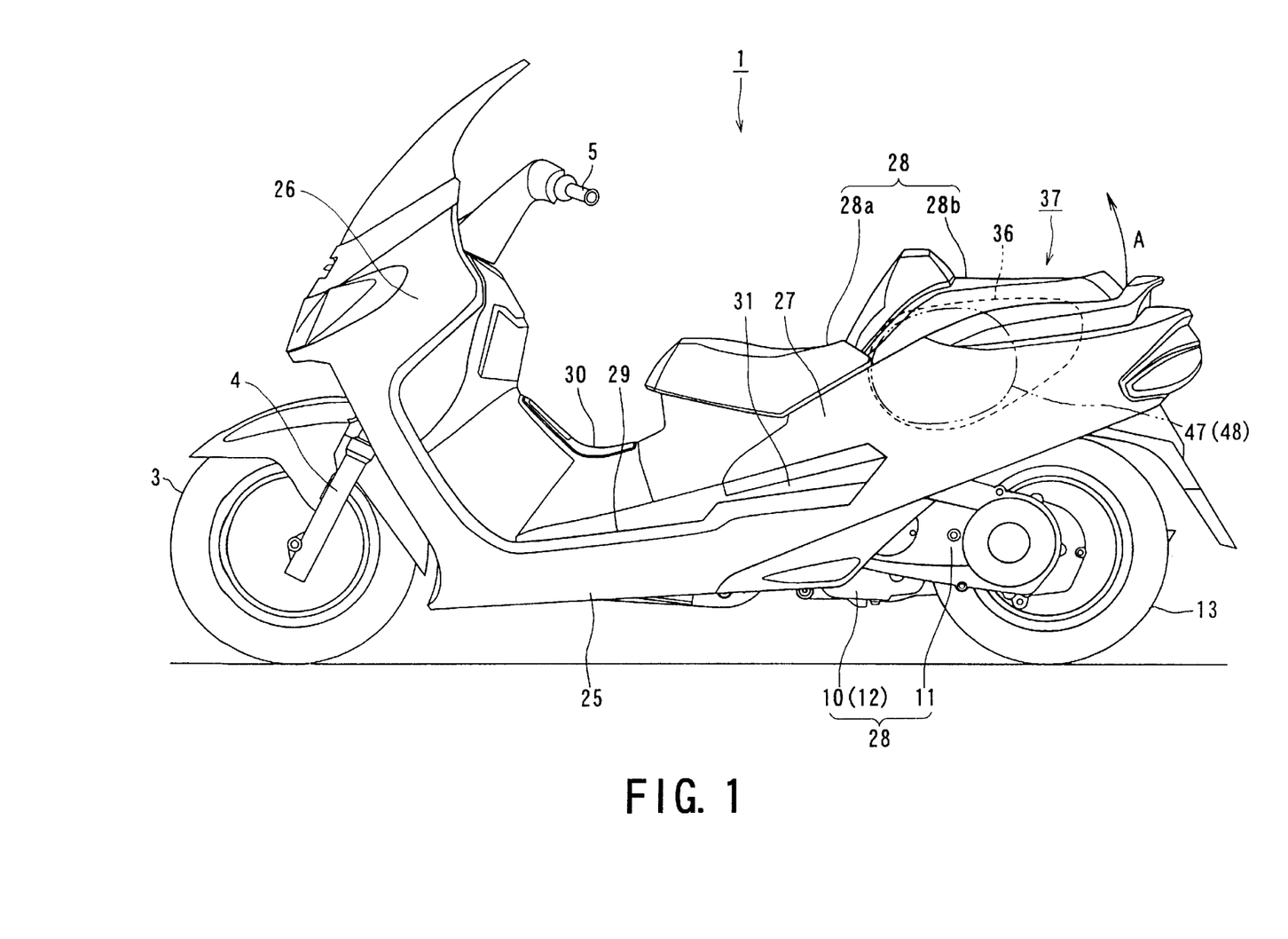
FIG. 1 is a left side view showing a scooter type motorcycle to which an article storage device of the present invention is applied.
Figure 2:
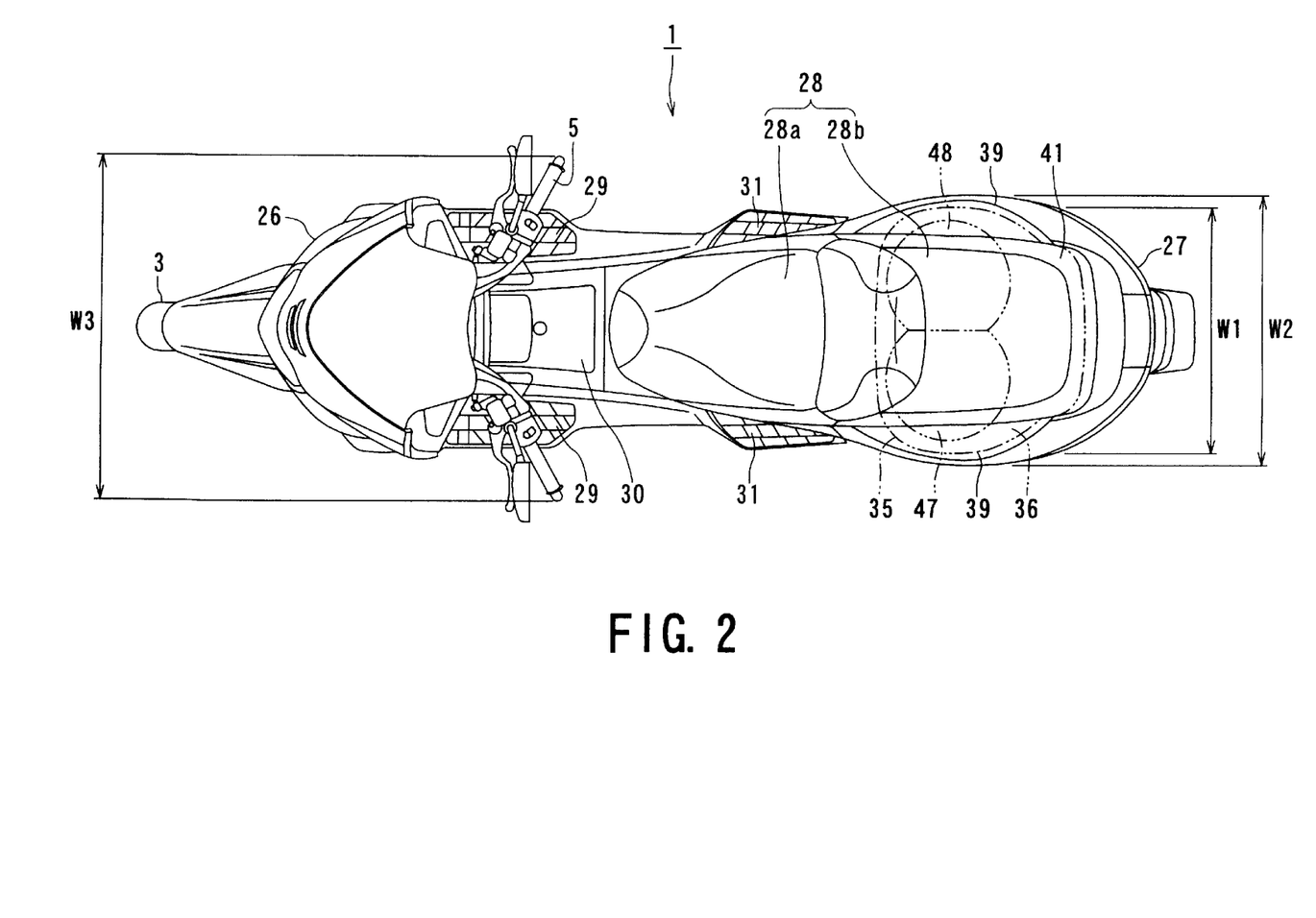
FIG. 2 is a plan view showing the scooter type motorcycle of FIG. 1.
Figure 3:
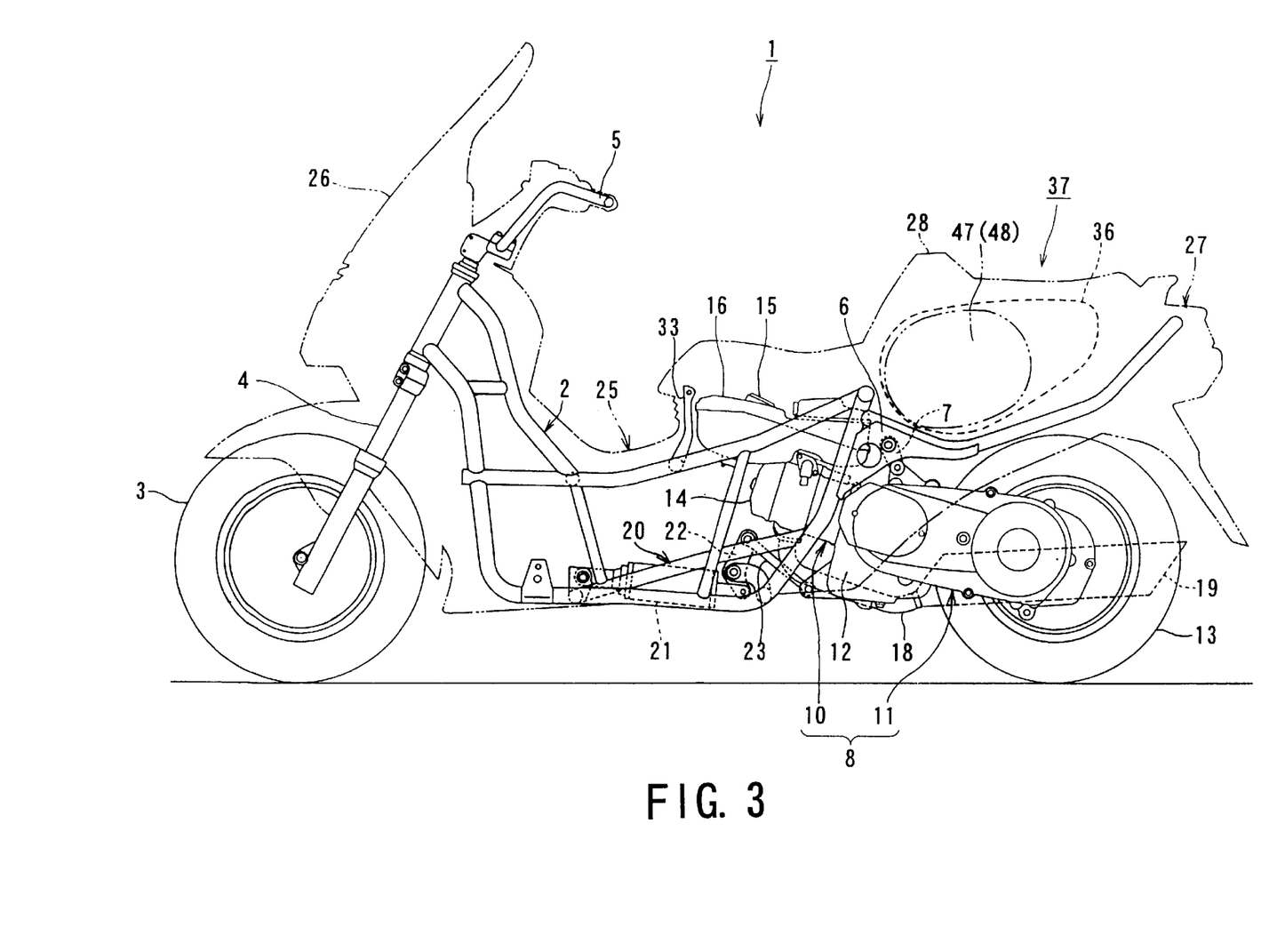
FIG. 3 is a layout diagram showing an inside of the vehicle (motorcycle)
Figure 4:
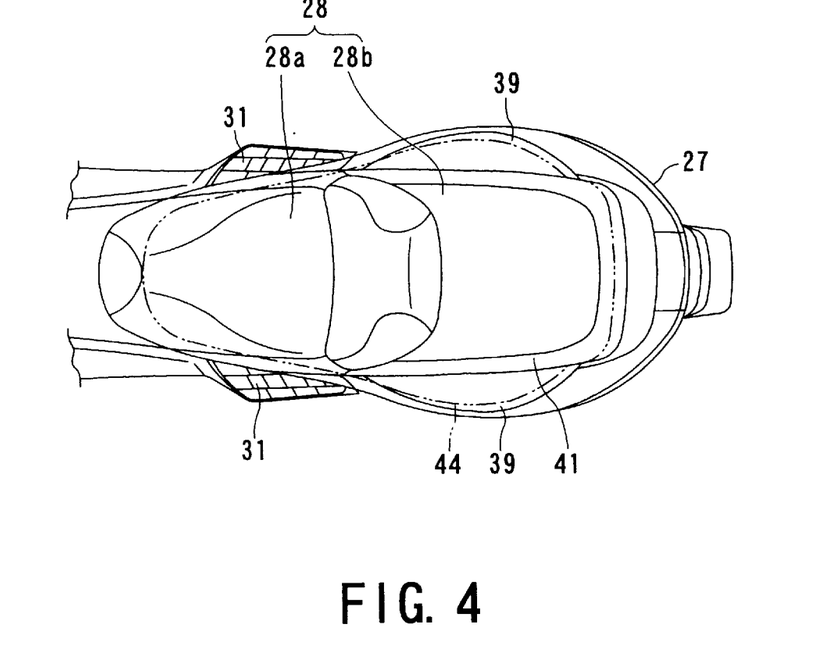
FIG. 4 is a plan view showing a seat of the motorcycle of FIG. 2.

With reference to FIGS. 1 to 3, the scooter type vehicle, i.e., a motorcycle, 1 has a body frame 2 made of steel pipe shown in FIG. 3, and a front fork 4 and a handle bar 5 for holding a front wheel 3 are pivotally supported to a front head section of the body frame 2 so as to be freely rotatable in the bilateral direction of the vehicle body. Meanwhile, a power unit 8 is arranged to a suspension bracket 6 provided to a rear section of the body frame 2 via a suspension link 7 to be swung up and down.

The power unit 8 is integrally composed of an engine 10 and a swing case 11 which are well known to be used for a scooter type vehicle. For example, the engine 10 is of a four-stroke-cycle single cylinder engine. The swing case 11 is connected to a left side surface of a crankcase 12 of the engine 10 and extends backward, and a rear wheel 13 is axially supported to a right side surface of its rear section. A continuously variable (non-stage) transmission using a V-belt, a reduction gear device, and an engine starting device and the like are all housed in the swing case 11. A power of the engine 10 is automatically varied and transmitted to the rear wheel 13.

In addition, a cylinder 14 extending substantially horizontally in the forward direction is provided on the front surface of the crankcase 12 of the engine 10. A carburetor 15 and an air cleaner 16 composing an intake system of the engine 10 are provided above the cylinder 14. Further, an exhaust pipe 18 is disposed to extend backward from a lower surface of the cylinder 14 and connected to an exhaust muffler 19 positioned on the right side of the rear wheel 13.

In the running state of the scooter type vehicle 1, when the rear wheel 13 moves up and down due to an irregular road condition, the power unit 8 and the auxiliary machineries, including the carburetor 15, the air cleaner 16 and the exhaust muffler 19, are all integrally swung up and down with the suspension link 7 being a fulcrum for the swing motion. Further, the exhaust muffler 19 is provided to be approximately parallel with the road surface in a side view.

A suspension 20 of the power unit 8 is arranged on the front side and below the engine 10 (cylinder 14). For example, a front end of a shock absorber 21, which is arranged to a lower portion of the body frame 2 to be approximately horizontal in the longitudinal direction, is supported to the body frame 2, and its rear end is linked with a point of force of a link 22 which is pivotally supported by the body frame 2 to be freely rotatable, and a point of application of the link 22 is linked to the front surface of the crankcase 12 of the power unit 8 through a coupling rod 23. The shock absorber 21 expands and contracts according to the up-and-down swing motion of the power unit 8 so as to absorb the swinging shock.

A periphery of the body frame 2 is wholly covered with a frame cover 25 made of synthetic resin so that a streamline fairing 26 is formed on the front head portion of the vehicle body. Meanwhile, a rear body 27 is formed on the rear half portion of the vehicle body, and a seat 28 is disposed to the upper portion of the rear body 27. Moreover, as shown in FIGS. 1 and 2, a section between the handle bar 5 and the seat 28 is indented deeply downward, and a low-floor type step board 29 is arranged to this section. A pair of step boards 29 are arranged on right and left sides, straddling a middle portion, of the body frame 2, and a fuel tank and the like, not shown, are disposed in a center console 30 arranged between the step boards 29.

The seat 28 is designed so that a pillion (fellow rider's seat) section 28b where a fellow rider sits is connected to a rear portion of a rider's seat section 28a where a rider sits at a position higher by one stage. The rider sitting on the rider's seat section 28a places both feet on the step boards 29, and the fellow rider sitting on the pillion section 28b places both feet on a pair of left and right fellow rider foot rests 31. The fellow rider foot rests 31 are integrally formed on the rear body 27 so as to be connected with the rear part of the step board 29 at a position higher by one stage.

In addition, as shown in FIG. 3, the front end portion of the seat 28 is pivoted to the upper end of a seat bracket 33 which is projected from a middle section of the body frame 2 to be freely rotatable and pilled up in an arrowed direction A shown in FIG. 1 to be opened. Moreover, an article accommodation box 36 of a bottomed container structure which has an article port (article entrance/take-out port) 35 opened upward is provided inside the rear body 27 below the seat 28, thus constituting an article storage device 37. When the seat 28 is opened, a large article can be put into or taken out of the article accommodation box 36.

Since the power unit 8 and the rear wheel 13 are disposed just below an article storage chamber, the article storage device 37 is arranged so that the rear wheel 13 does not interfere with the bottom surface of the article accommodation box 36 when the power unit 8 is in the top position of the swinging range. The carburetor 15 and the air cleaner 16 are laid just in front of the article accommodation box 36, and when the seat 28 is opened, the maintenance of the carburetor 15 and the air cleaner 16 can be easily performed.

Figure 5:
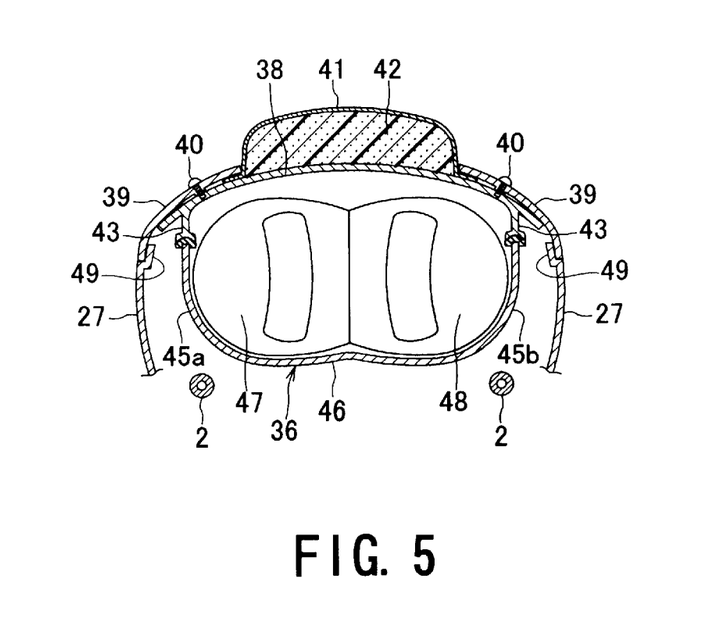
FIG. 5 is a cross section showing the seat and an article accommodation box.

In FIG. 2, the article port 35 of the article accommodation box 36 is formed to be wider in its lateral width than an outer peripheral edge of the seat 28 as shown by a two-dot-chain line line, whereas as shown in FIG. 5, a cover member 39 having a bowed shape in a plan view is fixed to the upper surface of a bottom plate 38 of the seat 28 by means of vises 40. The cover member 39 covers the article port 35 of the article accommodation box 36 from an upper direction. When the cover member 39 is fixed to the upper surface of the bottom plate 38 by means of vises 40, an outer periphery of a seat cover 41 of the seat 28 is nipped so that a seat cushion 42 formed by sponge or the like is fixed.

In addition, a maximum lateral width W1 of the accommodation box 36 is provided on the rear position more than the front end of the sitting position of the pillion 28b as shown in FIG. 2 and on the rear position more than the fellow rider foot rests 31. Moreover, a vehicle lateral width W2 in the maximum width W1 of the accommodation box 36 is set to be smaller than a whole lateral width W3 of the handle bar 5.

Figure 6:
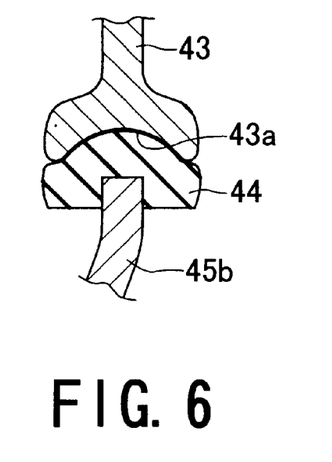
FIG. 6 is an enlarged cross section showing an engagement state of a seat bottom and an article port of the motorcycle of FIG. 5.

Meanwhile, as shown in FIG. 6, a seat bottom 43 is integrally formed to the lower surface of the bottom plate 38 of the sitting seat 28 along an outer peripheral edge in the vicinity of the lower surface of the bottom plate 38 of the seat 28, and an arc-shaped concave section 43a having a width wider than the thickness of the seat bottom 43 is integrally formed on a lowermost section of the seat bottom 43.

In addition, a seal member 44, which is formed of rubber, synthetic resin or the like along an entire periphery of the opening edge of the article port 35 so as to provide a convex shape, is attached to the article port 35 of the article accommodation box 36. The seal member 44 is engaged with the arc-shaped concave section 43a of the seat bottom 43.

Furthermore, the article accommodation box 36 is provided with left and right side sections 45a and 45b, which are formed into arc shapes according to a shape of an article (articles) to be stored as shown in FIG. 5. and a bottom section 46 connected to both the side sections 45a and 45b is also formed into an arc shape on the left and right sides. Therefore, two full-faced helmets 47 and 48 can be stored in the article accommodation box 36 in a state that they are arranged in left and right (lateral) positions as viewed in a plan view.

In this case, since the article accommodation box 36 is formed according to the shapes of the two full-faced helmets 47 and 48 as articles to be stored, the two full-faced helmets 47 and 48 can be held securely with no useless dead space and no movement of the helmets stored in the accommodation box 36.

In addition, the outer peripheral edges of a pair of the right and left cover members 39 are engaged with an engagement flange 49 which is formed on an upper end of the rear body 27 to be fixed thereto as shown in FIG. 5.

Furthermore, in the present embodiment, the article port 35 of the article accommodation box 36 is formed to be wider than the outer peripheral edge of the seat 27, and the cover member 39 which covers the article port 35 of the accommodation box 36 is secured to the bottom plate 38 of the seat 28. As a result, a lot of large article can be stored orderly without exerting a bad influence on the function of the vehicle operation such as vehicle driving or steering stability.

In addition, the article port 35 is formed to be wider than the outer peripheral edge of the seat 28 in the vehicle lateral direction, so that the article port 35 can be larger than a conventional one, and hence, a large article can be easily put in or taken out. Further, the location of the cover member 39 covering the article port 35 of the accommodation box 36 allows the article port 35 to become larger than a conventional one without damaging outer appearance.

Further, the maximum width W1 of the article accommodation box 36 is formed to the rear position more than the seat front end of the pillion so that the vehicle body below the rider seat 28a becomes slim, and pedaling ability and riding properties of a rider are made acceptable. Moreover, the portion having the maximum width W1 of the article accommodation box 36 is provided in the rear position more than the fellow rider foot rests 31 so that the rear body 27 hardly interferes with feet of a fellow rider sitting on the pillion 28b, and thus, the riding properties can be improved without deteriorating comfort of the fellow rider.

In addition, the vehicle width W2 in the maximum width W1 of the article accommodation box 36 is set to be smaller than the whole width W3 of the handle bar to obviate a bad effect on the vehicle narrow road passing characteristic.

Furthermore, the article accommodation box 36 is formed so as to store the plural helmets 47 and 48 in a state that they are arranged in the left and right positions as viewed in a plan view. As a result, the article accommodation box 36 can be applied to a scooter type motorcycle on which two riders can ride.

Figure 7:
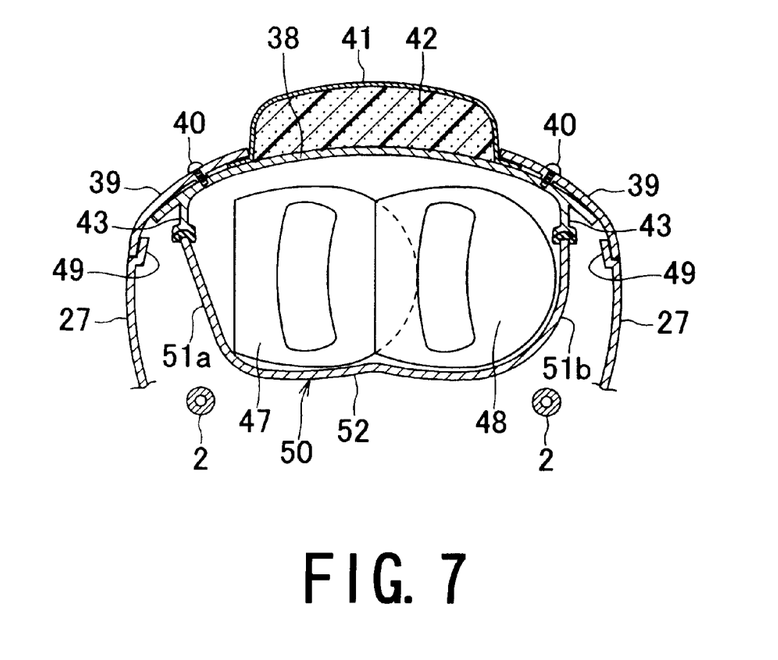
FIG. 7 is a cross section showing a modified example of the accommodation box.

FIG. 7 is a cross sectional view showing a modified example of the article accommodation box 36. In an illustrated state, an article accommodation box 50 of the modified example is constituted so that a left surface section 51a is formed into a flat plate shape and a right surface section 51b is formed into an arc shape, and a bottom section 52 which is connected to both the surface sections 51a and 51b is also formed to provide arc shapes at the left and right bottom positions. Therefore, the two full-faced helmets 47 and 48 are stored in an overlapped state in the lateral left-and-right width direction in the article accommodation box 50.

Figure 8:
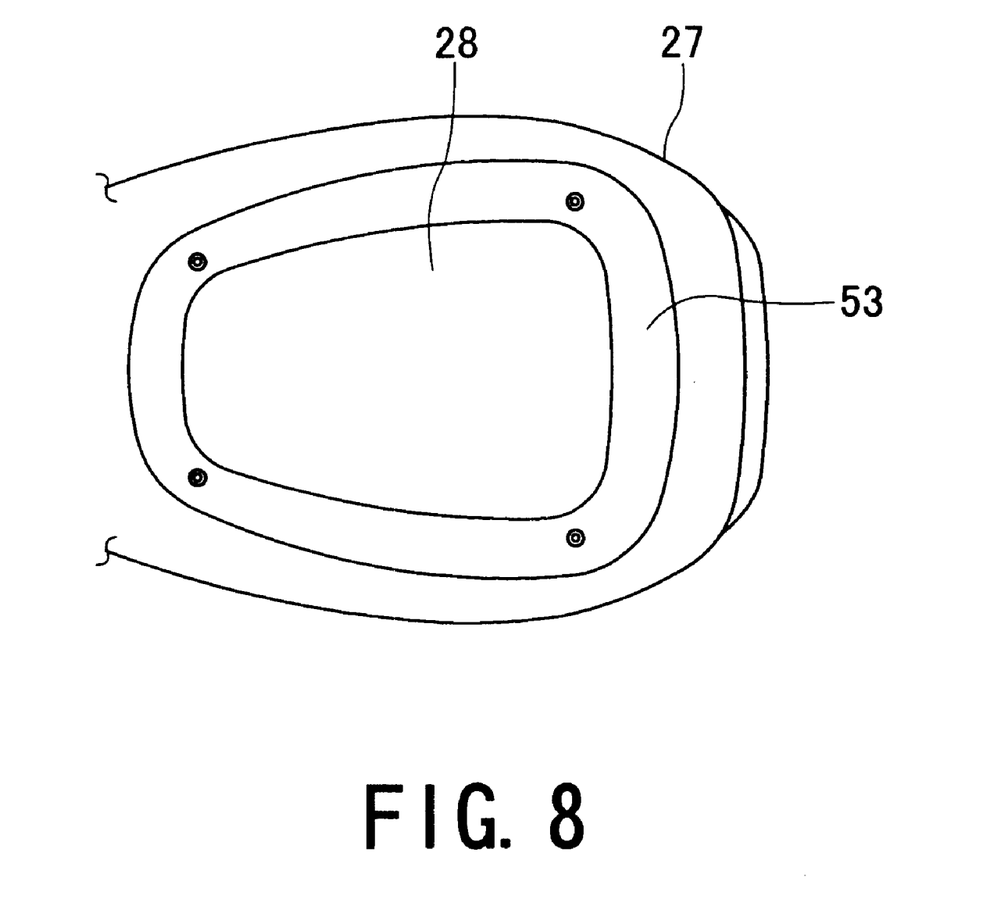
FIG. 8 is a schematic plan view showing a modified example of a cover member.

FIG. 8 is a schematic plan view showing a modified example of the cover member 39. A cover member 53 of the modified example is constituted into an annular shape so as to surround the entire periphery of the seat 28 and cover the article port 35 of the article accommodation box 36 from the upper direction.

Therefore, the cover member 53 is formed into an annular shape so as to surround the entire periphery of the seat 28, so that the cover member 53 covers not only the article port 35 formed to be wider but also the entire periphery of the seat 28, thus improving the outer appearance of the vehicle.

The present invention is not limited to the above-mentioned embodiment and the modified examples, and various changes and modifications may be carried out. For example, in the above embodiment, there is explained the example that the article storage device 37 is applied to the scooter type motorcycle, but the application is not limited to the scooter type, and the structure of the article storage device of the present invention can be applied to motorcycles of another type vehicle.

In addition, the above embodiment and modified examples explained the case where the two helmets 47 and 48, as large article, are stored in the article accommodation box 36, but the present invention is not limited to the accommodation of such article of helmet, and the another large article and long article such as an attache case may be stored in the accommodation box 36.

Furthermore, although the above embodiment explained the example that the present invention is applied to the scooter type vehicle for two riders, similarly, in a scooter type vehicle for one rider, an article port of an article accommodation box is formed to be wider than an outer peripheral edge of a seat 27 in the body lateral direction, and a cover member which covers the article port of the article accommodation box may be provided on a bottom plate of the seat.

What is claimed is:

1. An article storage device of a motorcycle, comprising:
an article accommodation box having an article entrance port formed so as to be opened upward in a standing state of the motorcycle, said article entrance port having a lateral width larger than a lateral width of an outer peripheral edge of a seat; and a cover member provided for a bottom portion of the seat so as to cover the article entrance port of the article accommodation box, wherein substantially all of said article accommodation box is positioned below the seat and between the seat and a rear wheel of the motorcycle, and said article accommodation box has a maximum lateral width larger than the lateral width of the outer peripheral edge of the seat.

2. An article storage device of a motorcycle according to claim 1, wherein said seat includes a seat section on which a rider sits and a pillion section on which a fellow rider sits, the pillion section connected to a rear portion of the seat section on which the rider sits, and said maximum lateral width portion of the article accommodation box positioned behind a front end portion of a sitting portion of the pillion in a longitudinal direction of a body of the motorcycle.

3. An article storage device of a motorcycle according to claim 2, wherein fellow rider foot rests for the fellow rider are disposed to lower portions of the motorcycle body on both lateral left and right sides of the seat and said maximum lateral width portion of the article accommodation box is provided to a rear portion more than the fellow rider foot rests in the longitudinal direction of the motorcycle body.

4. An article storage device of a motorcycle according to claim 3, wherein a lateral width of a portion of the motorcycle body at which the article accommodation box has the maximum lateral width is set to be smaller than an entire width of a handle bar of the motorcycle.

5. An article storage device of a motorcycle according to claim 1, wherein article to be accommodated in the article accommodation box is two helmets and said article accommodation box has an inner space in which the two helmets are arranged side by side in the width direction of the vehicle body in a plan view.

6. An article storage device of a motorcycle according to claim 1, wherein article to be accommodated in the article accommodation box is two helmets and said article accommodation box has an inner space in which the two helmets are arranged in an overlapped state in the width direction of the vehicle body in a plan view.

7. An article storage device of a motorcycle according to claim 1, wherein the motorcycle is a scooter type motorcycle and the seat includes a rider's seat section and a pillion section.

8. An article storage device of a motorcycle according to claim 1, wherein said cover member is fixed to an upper surface of a bottom portion of the seat by means of vises together with a seat cover of the seat.

9. An article storage device of a motorcycle according to claim 2, wherein said maximum lateral width is smaller than a width of the body of the motorcycle.

10. An article storage device of a motorcycle according to claim 2, wherein said article accommodation box includes a substantially flat bottom portion.

* * * * *